(12) United States Patent
Irgang et al.

(10) Patent No.: US 7,157,406 B2
(45) Date of Patent: Jan. 2, 2007

(54) CATALYSTS OR CARRIERS WHICH CONSIST ESSENTIALLY OF MONOCLINIC ZIRCONIUM DIOXIDE

(75) Inventors: Matthias Irgang, Heidelberg (DE); Michael Hesse, Schifferstadt (DE); Werner Schnurr, Herxheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/984,225

(22) Filed: Nov. 9, 2004

(65) Prior Publication Data

US 2005/0085381 A1    Apr. 21, 2005

Related U.S. Application Data

(63) Continuation of application No. 08/892,561, filed on Jul. 14, 1997, now abandoned, which is a continuation of application No. 08/571,091, filed on Dec. 12, 1995, now abandoned.

(30) Foreign Application Priority Data

Dec. 17, 1994 (DE) .................. 44 45 142

(51) Int. Cl.
*B01J 23/00* (2006.01)
*C01G 25/02* (2006.01)
*C01G 23/00* (2006.01)
*C22B 34/10* (2006.01)

(52) U.S. Cl. ............... 502/349; 423/594.12; 423/608; 423/85

(58) Field of Classification Search ........... 502/349; 423/594.12, 608, 81, 82, 85
See application file for complete search history.

(56) References Cited

U.S. PATENT DOCUMENTS 4,440,875 A    4/1984    Kortbeek et al.
4,784,794 A *  11/1988   Kato ........................ 516/90
4,925,647 A *  5/1990    Kirchhofer ............... 423/592.1
5,004,719 A    4/1991    Deller et al.
5,010,052 A    4/1991    Quemere
5,130,287 A    7/1992    Sweeney
5,269,990 A    12/1993   Khare et al.
5,380,691 A *  1/1995    Popa ....................... 502/170
5,447,898 A *  9/1995    Blankenstein et al. ...... 502/349
5,716,565 A *  2/1998    Stangle et al. ............. 264/681
6,034,029 A *  3/2000    Wulff-Doring et al. ..... 502/308

FOREIGN PATENT DOCUMENTS

| DE | 3406185 | 9/1986 |
|---|---|---|
| DE | 3803898 | 8/1989 |
| EP | 244301 | 11/1987 |
| EP | 460 438 | 12/1991 |
| EP | 520 543 | 12/1992 |
| EP | 716883 | * 6/1996 |
| FR | 2590887 | 12/1985 |
| WO | 94/08914 | 4/1994 |

OTHER PUBLICATIONS

*Comp. Inorganic Chem.*, Ed. Bailar Jr., Pergamon Press, 1973, pp. 424-426, no month.

* cited by examiner

*Primary Examiner*—Karl Group
*Assistant Examiner*—Patricia L. Hailey
(74) *Attorney, Agent, or Firm*—Novak Druce Deluca & Quigg, LLP

(57) ABSTRACT

Catalysts or carriers which consist essentially of monoclinic zirconium dioxide are prepared by pecipitation of zirconium salts with ammonia, by adding a zirconyl nitrate or zirconyl chloride solution to an aqueous ammonia solution at a decreasing pH from 14 to 6 and drying, calcining and pelletizing the product.

11 Claims, No Drawings

CATALYSTS OR CARRIERS WHICH CONSIST ESSENTIALLY OF MONOCLINIC ZIRCONIUM DIOXIDE

This application is a continuation of application Ser. No. 08/892,561, filed on Jul. 14, 1997 (now abandoned), which is a File-Wrapper Continuation (FWC) of application Ser. No. 08/571,091, filed on Dec. 12, 1995 (also now abandoned).

The present invention relates to catalysts or carriers which consist essentially of monoclinic zirconium dioxide and are obtained by precipitation of special zirconium salts with aqueous ammonia solutions at decreasing pH from 14 to 6, drying, calcination and pelletization.

Crystalline zirconium dioxide occurs in a stable monoclinic modification below 1000° C., and in addition in a metastable tetragonal modification.

Catalysis Today 20 (1994), 199–218 and 295–312, discloses the production of zirconium dioxide powders having a defined crystal structure.

Considerable difficulties are encountered in the preparation of monoclinic zirconium dioxide having a large surface area, since precipitation generally gives the water-rich alpha-zirconium hydroxide, from which the metastable tetragonal $ZrO_2$ is formed, the latter being transformed into the monoclinic modification only at above 650° C. and experiencing a considerable reduction in its surface area during the heating.

According to Catalysis Today 20 (1994), 295–312, a mixture of about 70% of the monoclinic modification and about 30% of the tetragonal modification of $ZrO_2$ is obtained by hydrothermal treatment of precipitates obtained from zirconium salts and KOH at a pH of from 8 to 12. It is also possible to convert zirconyl chloride into the monoclinic $ZrO_2$ by means of hydrolysis by boiling at pH<1.

Similar precipitates of zirconium hydroxide as a result of adding ammonia to zirconyl nitrate solution are described in FR-A-25 90 887, Example 1, and in J. Catalysis 141 (1993), 280.

DE-A-34 06 185 and DE-A-38 03 898 describe processes for the preparation of $ZrO_2$ pellets in which zirconium dioxide powder prepared by a pyrogenic method is mixed with organic and inorganic binders and the mixture is pelletized and is heated at 700° C.

Such moldings contain about 50% of tetragonal zirconium dioxide and, as a result of heating at above 600° C., have a surface area which is too small for most catalytic processes.

Further moldings of $ZrO_2$ are described in WO-A-94/08914, U.S. Pat. No. 5,269,990, FR-A-25 90 887 and EF-A-244 301. Starting from zirconium hydroxide or zirconium oxide, a moldable material is prepared with the aid of suitable additives and is extruded, dried, and calcined at from 400 to 700° C.

These extruded catalysts have high abrasion values and are therefore unsuitable for many applications.

It is an object of the present invention to remedy the abovementioned disadvantages.

We have found that this object is achieved by novel and improved catalysts or carriers which consist essentially of monoclinic zirconium dioxide, prepared by precipitation of zirconium salts with ammonia, wherein a zirconyl nitrate or zirconyl chloride solution is added to an aqueous ammonia solution, the pH decreasing from 14 to 6, and the precipitated product is thoroughly washed, dried, calcined and pelletized.

The novel catalysts or carriers, which as a rule consist of from 85 to 100, particularly from 90 to 100, % by weight of monoclinic zirconium dioxide, can be prepared as follows:

First, a very concentrated, as a rule from 2 to 5 mol %, zirconium chloride solution is prepared from zirconium carbonate and hydrochloric acid or preferably a very concentrated, as a rule from 2 to 5 mol %, zirconium nitrate solution is prepared from zirconium carbonate and nitric acid. This solution is added to an initially taken water/ammonia mixture (about 15 mol % of $NH_3$), as a rule at from 20 to 60° C. and with monitoring of the pH, the addition being completed at a pH of from 6 to 8 and the pH not being allowed to fall below 6.

The precipitated product can be thoroughly washed on a filter press and essentially freed from ammonium salts, dried, and calcined at from 300 to 600° C., preferably from 400 to 500° C., and from 0.05 to 1 bar. Occasionally, the zirconium dioxide thus prepared also contains a small amount of the tetragonal modification. This amount can be reduced to the detection limit of X-ray diffraction if drying is carried out under a water vapor partial pressure of from 0.2 to 0.9 bar. Drying then requires, as a rule, about 16 hours at 120° C.

The monoclinic zirconium dioxide powder calcined at 400° C. can be further processed as follows:

The $ZrO_2$ powder (particle size from 10 to 100 µm) is mixed with from 0.5 to 10, preferably from 1 to 5, % by weight of a pelletizing assistant, such as graphite or magnesium stearate, and compressed, for example, on an eccentric or rotary tablet press at pressures of from 1 to 30, preferably from 1 to 15, particularly preferably from 1 to 6, kN per tablet. In order to improve the water resistance, this may be followed by further heating at from 300 to 600° C.

This method gives very strong $ZrO_2$ catalyst pellets which exhibit little abrasion. In particular, they generally have a BET surface area of from 60 to 150, preferably from 80 to 100, $m^2/g$, which is high for zirconium dioxide, and a porosity of from 0.1 to 0.5, as a rule more than 0.20, ie. from 0.25 to 0.5, ml/g.

The pore distribution determined by mercury porosimetry shows, as a rule, two maxima at pore radii of about 70 AU and 4000 AU. The proportion of macropores having pore radii above 1000 AU is from 20 to 50%, as a rule from 20 to 35%, of the total pore volume.

The lateral compressive strength of 3×3 mm pellets generally reaches from 50 to 200 N.

Their abrasion after treatment for 2 hours with porcelain balls in a Vibration vibratory mill at a frequency of 25 Hz is from 1 to 10%, preferably from 1 to 5%.

The pellets obtained are particularly clinically stable both to acids and to bases.

The preparation process described avoids long-lasting and difficult process stages, for example hydrothermal conditions, and is therefore less expensive.

The essential advantage of the novel zirconium dioxide pellets is their high mechanical strength and their high proportion of monoclinic crystal structure.

The novel precipitated products or their moldings can be doped by impregnating, coating or spraying with metals or metal salt solutions, such as the nitrates, acetates or formates of the transition elements, preferably nitrates of Ni, Co, Cu, Pd and Pt and of Mn, Cr and La.

These catalysts are preferably used for hydrogenations and dehydrogenations.

Carriers for acidic catalysts and superacids are generally obtained starting from the zirconium hydroxide precipitated in the above process, which is doped with sulfuric acid or hetero polyacids, dried and pelletized, and the prepared pellets are calcined.

The $ZrO_2$-containing catalysts can be used, for example, in the hydrogenation of aromatic carboxylic acids to give the corresponding aldehydes, in the Fischer-Tropsch synthesis., in steam reforming and in desulfurization and, in the form of sulfated zirconium oxides, as superacids in isomerizations or polymerizations.

EXAMPLES

Example 1

A zirconyl nitrate solution containing 19% by weight of $ZrO_2$ and having a density of 1.57 g/ml is obtained by dissolving zirconium carbonate (MEL, about 43% by weight of $ZrO_2$) in concentrated nitric acid.

Ammonia water (12.5% by weight of $NH_3$) was initially taken in a stirred container, and the zirconyl nitrate solution was then pumped in with simultaneous stirring in the course of 60 minutes until a pH had reached 7.5. During this procedure, the temperature increased to 54° C. After stirring had been carried out for 10 minutes, the product was thoroughly washed on a filter press to a conductivity of 20 μS/cm and was dried at 120° C. and calcined at 400° C.

The product was finely crystalline and had a BET surface area of 81 m²/g. It consisted of 95% of monoclinic zirconium dioxide and 5% of tetragonal zirconium dioxide.

This powder was thoroughly mixed with 3% of magnesium stearate and compressed on a rotary tablet press to give 3×3 mm pellets. This was followed by further heating at 400° C. The pellets obtained had the following properties:

| | |
|---|---|
| Bulk density: | 1290 g/l |
| Porosity: | 0.22 ml/g |
| BET surface area: | 74 m²/g |
| Lateral compressive strength: | 94 N |
| Compressive strength per unit area: | 4272 N/cm² |
| Abrasion: | 2.2% |

Example 2

The precipitation was carried out as in Example 1, and the precipitated product was dried for 16 hours at 120° C. in a steam atmosphere (water vapor partial pressure about 0.7 bar). Calcination was then carried out and the product was compressed to give 3×3 mm pellets and heated again.

The prepared pellets contained no tetragonal $ZrO_2$ detectable by X-ray diffraction.

The pellets obtained had the following properties:

| | |
|---|---|
| Bulk density: | 1280 g/l |
| Porosity: | 0.22 ml/g |
| BET surface area: | 91 m²/g |
| Lateral compressive strength: | 90 N |
| Compressive strength per unit area: | 6596 N/cm² |
| Abrasion: | 3.6% |

Example 3

Zirconium dioxide pellets prepared according to Example 1 were impregnated with an aqueous lanthanum nitrate solution with thorough mixing and kept for 2 hours at room temperature. Thereafter, they were dried at 120° C. and calcined for 2 hours at 400° C. The catalyst thus prepared contained 3.5% by weight of $La_2O_3$.

The $La_2O_3/ZrO_2$ catalyst was used for the hydrogenation of benzoic acid to benzaldehyde. In a tube reactor which contained 100 ml of catalyst, 8 g/h of molten benzoic acid and 100 l/h of hydrogen were passed over the catalyst at 340° C. and atmospheric pressure. The gaseous reacted mixture was condensed in cold traps and analyzed by gas chromatography. The benzaldehyde yield was 98% at a conversion of 100%.

Comparative Example A

Appl. Catalysis, 57 (1990), 128–129

A zirconyl nitrate solution containing 15% by weight of $ZrO_2$ was prepared by dissolving zirconium carbonate (MEL, about 43% by weight of $ZrO_2$) in concentrated nitric acid.

Ammonia water (12.5% by weight of $NH_3$) and zirconyl nitrate solution were then pumped simultaneously into initially taken demineralized water while stirring. In the precipitation, the pH was kept constant at 9.3. After stirring had been carried out for a further 10 minutes, the pH was brought to 7.5 by means of nitric acid to avoid the annoying odor.

The precipitated product was thoroughly washed, dried, and calcined at 400° C. A finely crystalline powder consisting of 60% of tetragonal zirconium dioxide and 40% of monoclinic zirconium dioxide was obtained.

Comparative Example B

According to FR-A-25 90 887, Example 1

A solution which contained 3.75% by weight of $ZrO_2$ (0.3 molar) was prepared from 60% strength nitric acid and zirconium carbonate (MEL, about 44% by weight of $ZrO_2$), with subsequent dilution with demineralized water.

This solution (pH=0.75) was initially taken in a stirred container. Ammonia water (25% by weight of $NH_3$) was then pumped in over 6 minutes until a pH of 10.4 was obtained.

The precipitated product was thoroughly washed on a filter press until the conductivity remained constant at 20 μS/cm, and was dried at 120° C. and calcined for 2 hours at 400° C. The resulting zirconium dioxide having a BET surface area of 149 m²/g was finely crystalline and contained about 80% of tetragonal modification and about 20% of monoclinic modification.

Comparative Example C

According to Catalysis Today 20 (1994), 296

A zirconyl nitrate solution containing 15% by weight of $ZrO_2$ was prepared by dissolving zirconium carbonate (MEL, about 43% by weight of $ZrO_2$) in concentrated nitric acid and refluxed with stirring; the pH was less than 1. Turbidity occurred after about 10 minutes and then became stronger on further boiling until a precipitate formed. Refluxing was carried out for 50 hours, after which the precipitate was filtered off, washed, dried and calcined at 400° C. The product had a BET surface area of 155 m²/g and consisted of 80% of tetragonal zirconium dioxide and 20% of monoclinic zirconium dioxide.

The material could not be pelletized.

Comparative Example D

ZrO₂ extrudates having a BET surface area of 100 m²/g and a tetragonal structure were used for the preparation of the catalyst.

Impregnation with a lanthanum nitrate solution and testing as a hydrogenation catalyst were carried out as in Example 3.

The benzaldehyde yield determined by gas chromatography was 39% at a conversion of 43%.

We claimed:

1. A process for the preparation of zirconium dioxide catalyst or carrier consisting essentially of at least 85% by weight of the monoclinic modification of said zirconium dioxide and not more than 15% by weight of its tetragonal modification, which comprises:
   preparing a concentrated aqueous acidic solution of a zirconium salt selected from the group consisting of zirconium chloride and zirconium nitrate;
   adding this initially prepared solution gradually to a basic water/ammonia mixture at a temperature of about 20 to 60° C. such that the pH value is slowly reduced from its initial upper limit of 14 until the addition is completed at a final pH value of from 8 down to not less than 6, the precipitate being recovered essentially free of ammonium salts, and
   subsequently drying and calcining the recovered precipitate at temperatures of from 300 to 600° C. and at pressures of from 0.5 to 5 bar.

2. The process of claim 1, wherein any residual zirconium dioxide having the tetragonal modification is removed from the recovered precipitate prior to calcination by drying at an elevated temperature and under a water vapor partial pressure of from 0.2 to 0.9 bar.

3. The process of claim 2, wherein the precipitated product or its molding is doped with sulfuric acid or a heteropolyacid to obtain a molded acidic catalyst or carrier.

4. The process of claim 2, wherein the precipitated product or its molding is doped with a metal or metal salt solution as a catalyst component.

5. The process of claim 1 wherein the zirconium salt is zirconium nitrate.

6. The process of claim 1 wherein the drying and calcining of the recovered precipitate forms a zirconium dioxide powder having a particle size from 10 to 100µm.

7. A catalyst or carrier consisting essentially of monoclinic zirconium dioxide which has been prepared by a process comprising the steps of initially precipitating a zirconium salt by adding zirconyl nitrate or zirconyl chloride solution to an aqueous ammonia solution at a gradually decreasing pH of the initial ammonia solution down to a final pH value in the range of from 8 to not less than 6, and then subjecting the resulting precipitate to drying and calcining to obtain a zirconium dioxide powder having a particle size from 10 to 100 µm and molding to obtain a pelletized or other molded product, wherein the precipitated product is filtered off, ammonium salts are removed, and drying is effected at a water vapor partial pressure of from 0.2 to 0.9 bar and calcination is carried out at from 300 to 600° C., and wherein said powder or moldings thereof is or are doped by impregnation, coating or spraying with metals or metal salt solutions.

8. A catalyst or carrier comprising from 85 to 100% by weight monoclinic zirconium dioxide, which catalyst or carrier has been prepared by a process comprising the steps of initially precipitating a zirconium salt by adding zirconyl nitrate or zirconyl chloride solution to an aqueous ammonia solution at a gradually decreasing pH of the initial ammonia solution down to a final pH value in the range of from 8 to not less than 6, and then subjecting the resulting precipitate to drying and calcining to obtain a zirconium dioxide powder having a particle size from 10 to 100 µm, and molding to obtain a pelletized or other molded product, wherein the precipitated product is filtered off, ammonium salts are removed, and drying is effected at a water vapor partial pressure of from 0.2 to 0.9 bar and calcination is carried out at from 300 to 600° C., and wherein said powder or moldings thereof is or are doped by impregnation, coating or spraying with metals or metal salt solutions.

9. The catalyst or carrier of claim 8 comprising from 90 to 100% by weight monoclinic zirconium dioxide.

10. The catalyst or carrier of claim 8 which is essentially free of tetragonal zirconium dioxide.

11. The catalyst or carrier of claim 8 wherein the zirconium salt is precipitated by adding zirconyl nitrate solution to the aqueous ammonia solution.

* * * * *